(12) United States Patent
Curry et al.

(10) Patent No.: US 6,493,669 B1
(45) Date of Patent: Dec. 10, 2002

(54) SPEECH RECOGNITION DRIVEN SYSTEM WITH SELECTABLE SPEECH MODELS

(75) Inventors: David Gordon Curry, Kokomo, IN (US); Bradley S. Coon, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/572,133

(22) Filed: May 16, 2000

(51) Int. Cl.$^7$ ................................................ G10L 15/18
(52) U.S. Cl. ........................................ 704/257; 704/273
(58) Field of Search ................................ 704/270, 275, 704/255, 256, 257, 273, 272

(56) References Cited

U.S. PATENT DOCUMENTS

| | | | |
|---|---|---|---|
| 4,506,378 A | 3/1985 | Noso et al. | |
| 4,827,520 A | 5/1989 | Zeinstra | 381/43 |
| 5,440,606 A | 8/1995 | Faul et al. | |
| 5,566,271 A | 10/1996 | Tomitsuka et al. | |
| 5,583,965 A | 12/1996 | Douma et al. | |
| 5,719,950 A * | 2/1998 | Osten et al. | 340/5.82 |
| 5,774,858 A * | 6/1998 | Taubkin et al. | 704/270 |
| 6,018,711 A | 1/2000 | French-St. George et al. | |
| 6,144,938 A | 11/2000 | Surace et al. | |
| 6,240,347 B1 | 5/2001 | Everhart et al. | |
| 6,314,401 B1 * | 11/2001 | Abbe et al. | 704/272 |
| 6,334,103 B1 | 12/2001 | Surace et al. | |
| 6,336,091 B1 | 1/2002 | Polikaitis et al. | |
| 6,411,933 B1 * | 6/2002 | Maes et al. | 704/270 |
| 2001/0056349 A1 * | 12/2001 | St. John | 704/270 |

OTHER PUBLICATIONS

Robert W. Frischolz et al., BioID: A Multimodal Biometric Identification System pp. 64–68, Computer Magazine, Feb. 2000, vol. 33, No. 2.

Alex Pentland et al., Face Recognition for Smart Environments, pp. 50–55, Computer Magazine, Feb. 2000, vol. 33, No. 2.

P. Johathan Phillips et al., An Introduction to Evaluating Biometric Syustems, pp. 56–63, Computer Magazine, Feb. 2000, vol. 33, No. 2.

* cited by examiner

Primary Examiner—Richemond Dorvil
(74) Attorney, Agent, or Firm—Jimmy L. Funke

(57) ABSTRACT

A speech recognition driven system provides a speech model based on a biometric signature. Initially, the speech recognition driven system receives a biometric signature from a user of the system. Based upon the received biometric signature, the system selects a speech model. The selected speech model is utilized to determine whether a voice input provided by the user corresponds to a speech selectable task that is recognized by the speech recognition driven system. When the voice input provided by the user corresponds to the speech selectable task, the system causes the speech selectable task to be performed. In one embodiment, the biometric signature is an image of the user's face. When face recognition technology is implemented, the image of the user's face is utilized to select a speech model.

26 Claims, 3 Drawing Sheets

SPEECH RECOGNITION DRIVEN SYSTEM WITH SELECTABLE SPEECH MODELS

TECHNICAL FIELD

The present invention is directed to speech recognition, and more specifically to a speech recognition driven system with selectable speech models.

BACKGROUND OF THE INVENTION

A number of biometric signatures have been utilized to identify a particular individual. For example, fingerprint, retina, iris, face and voice recognition technologies have utilized pattern recognition techniques to uniquely identify a particular individual. Face and voice recognition systems are particularly attractive as they are normally unobtrusive and are passive (i.e., they do not require electromagnetic illumination of the subject of interest). A number of face recognition systems are currently available (e.g., products are offered by Visionics, Viisage and Miros). Further, some vendors offer products that utilize multiple biometric signatures to uniquely identify a particular individual. For example, Dialog Communication Systems (DCS AG) has developed BioID™ (a multimodal identification system that uses face, voice and lip movement to uniquely identify an individual).

As is well known to one of ordinary skill in the art, speech recognition is a field in computer science that deals with designing computer systems that can recognize spoken words. A number of speech recognition systems are currently available (e.g., products are offered by IBM, Dragon Systems, Learnout & Hauspie and Philips). Most of these systems modify a speech model, based on a user's input, to enhance accuracy of the system. Traditionally, speech recognition systems have only been used in a few specialized situations due to their cost and limited functionality. For example, such systems have been implemented when a user is unable to use a keyboard to enter data because the user's hands were disabled. Instead of typing commands, the user spoke into a microphone.

However, as the costs of these systems has continued to decrease and the performance of these systems has continued to increase, speech recognition systems are being used in a wider variety of applications (as an alternative to keyboards or other user interfaces). For example, speech actuated control systems have been implemented in motor vehicles to control various accessories within the motor vehicles.

A typical speech recognition system, that is implemented in a motor vehicle, includes voice processing circuitry and memory for storing data that represents command words (that are employed to control various vehicle accessories). In a typical system, a microprocessor is utilized to compare the user provided data (i.e., voice input) to stored speech models; to determine if a word match has occurred and provide a corresponding control output signal in such an event. The microprocessor has also normally controlled a plurality of motor vehicle accessories, e.g., a cellular telephone and a radio. Such systems have advantageously allowed a driver of the motor vehicle to maintain vigilance while driving the vehicle.

Acceptance of speech recognition as a primary interface for any multi-user system (e.g., an automobile), is dependent upon the recognition accuracy of the system. As mentioned above, a method for increasing speech recognition accuracy has been to implement systems, which adapt to a speaker. This has entailed storing a continuously updated version of a speech model for each word or subword in a given vocabulary. In this manner, the system adjusts to the speaking pattern of a given individual, thus increasing the probability for correct recognition. Unfortunately, such systems generally cannot be utilized by multiple users (unless the multiple users have nearly identical speech patterns).

As such, a system that provides multiple adaptable user specific speech models is desirable.

SUMMARY OF THE INVENTION

The present invention is directed to a method and system that provides a speech model based on a biometric signature. Initially, the speech recognition driven system receives a biometric signature from the user of the system. Based upon the received biometric signature, the system selects a speech model. The selected speech model is utilized to determine whether a voice input, provided by the user, corresponds to a speech selectable task that is recognized by the speech recognition driven system. When the voice input corresponds to the speech selectable task, the system causes the speech selectable task to be performed. In one embodiment, the biometric signature is an image of the user's face. When face recognition technology is implemented, the image of the user's face is utilized to select a speech model. In another embodiment, the system uses a default speech model when the system fails to recognize the biometric signature. In yet another embodiment, the system creates a new speech model when the system fails to recognize the biometric signature. In a different embodiment, the selected speech model is updated such that the system adapts to the speech pattern of the user. An advantage of the present invention is that when an individualized speech model is selected, the error rate of the speech recognition driven system is generally reduced.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

A speech recognition driven system, according to an embodiment of the present invention, selects an appropriate speech model based on a received biometric signature. When an individualized speech model is selected, the error rate of the speech recognition driven system is generally reduced. However, a default speech model may be utilized when a user (e.g., the driver) is not recognized or when the system cannot accept a new user. One of ordinary skill in the art will appreciate that, in this situation, the error rate is not reduced. A speech recognition driven system utilizing face recognition technology can be implemented without additional hardware in environments that already include a camera. Additionally, when implemented within an automobile, face recognition allows for the personalization of multiple automotive settings. For example, seat settings, mirror settings, radio pre-sets and multimedia functions (such as address books, phone lists, Internet bookmarks and other features) can be initiated with face recognition technology. Additionally, face recognition technology can provide additional security for a vehicle by controlling the operation of the vehicle (e.g., only allowing the vehicle to be placed into gear if the face of the driver is recognized).

Figure 1:
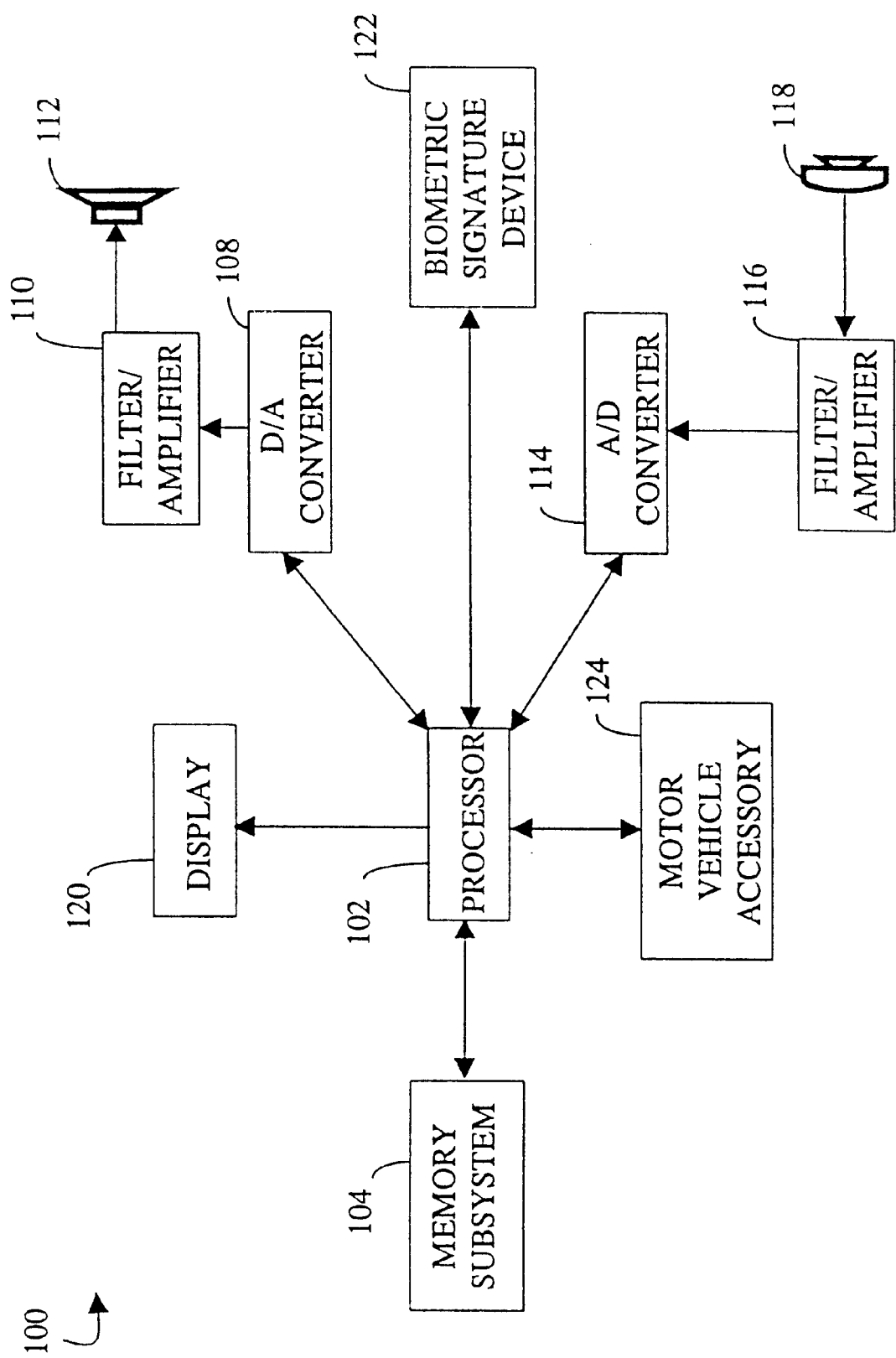
FIG. 1 is a block diagram of a speech recognition driven system implemented in a motor vehicle, according to an embodiment of the present invention.

Referring to FIG. 1, a block diagram of a speech recognition driven system 100 (implemented within a motor vehicle) that utilizes face recognition technology, according to an embodiment of the present invention, is depicted. System 100 includes a processor 102 coupled to a motor vehicle accessory 124 and a display 120. Processor 102 controls motor vehicle accessory 124, at least in part, as dictated by voice input supplied by a user of system 100. Processor 102 also supplies various information to display 120 to allow a user of the motor vehicle to better utilize system 100. In this context, the term processor may include a general-purpose processor, a microcontroller (i.e., an execution unit with memory, etc., integrated within a single integrated circuit) or a digital signal processor.

Processor 102 is also coupled to a memory subsystem 104. Memory subsystem 104 includes an application appropriate amount of main memory (volatile and non-volatile). An audio input device 118 (e.g., a microphone) is coupled to a filter/amplifier module 116. Filter/amplifier module 116 filters and amplifies the voice input provided by a user (through audio input device 118). Filter/amplifier module 116 is also coupled to an analog-to-digital (A/D) converter 114. A/D converter 114 digitizes the voice input from the user and supplies the digitized voice to processor 102 (which causes the voice input to be compared to system recognized commands). Processor 102 executes a commercially available routine to determine whether the voice input corresponds to a system recognized command.

Processor 102 may also cause an appropriate voice output to be provided to the user, ultimately through an audio output device 112. The synthesized voice output is provided by processor 102 to a digital-to-analog (D/A) converter 108. D/A converter 108 is coupled to a filter/amplifier module 110, which amplifies and filters an analog voice output. The amplified and filtered voice output is then provided to audio output device 112 (e.g., a speaker). While only one motor vehicle accessory module is shown, it is contemplated that any number of accessories typically provided in a motor vehicle (e.g., a cellular telephone or radio), can be implemented.

In a preferred embodiment, a biometric signature is provided to processor 102 by biometric signature device 122. In a preferred embodiment, device 122 is a digital camera that utilizes a charge coupled device (CCD). As is well known to one of ordinary skill in the art, a CCD includes an array of light sensitive elements (i.e., capacitors). The capacitors are charged by electrons generated by the light (i.e., photons) that reaches a given capacitor of the CCD array. In a preferred embodiment, the output of the CCD array is provided as a serial output (e.g., on a universal serial bus (USB)) to processor 102. The image derived from the CCD array is compared with stored images (or stored as a new image) and allows a stored speech model to be selected (or a new speech model to be created), based upon recognition of a specific user. One of ordinary skill in the art will appreciate that, device 122 can be an apparatus for receiving other user biometrics (e.g., fingerprints, retina and iris).

Figure 2A:
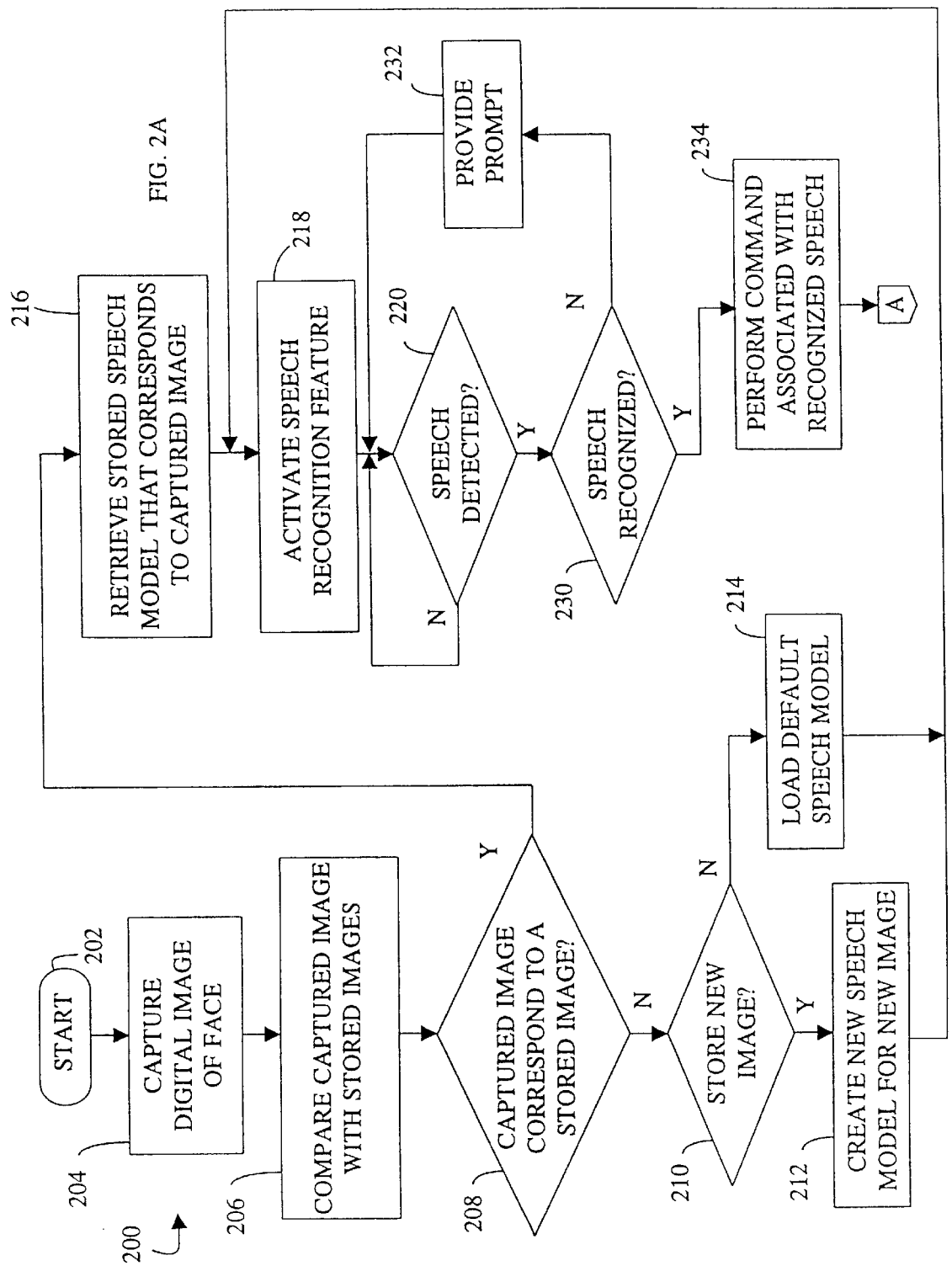
FIGS. 2A–2B are a flow diagram of a routine for a speech recognition driven system that selects a speech model based on a received biometric signature, according to an embodiment of the present invention.
Figure 2B:
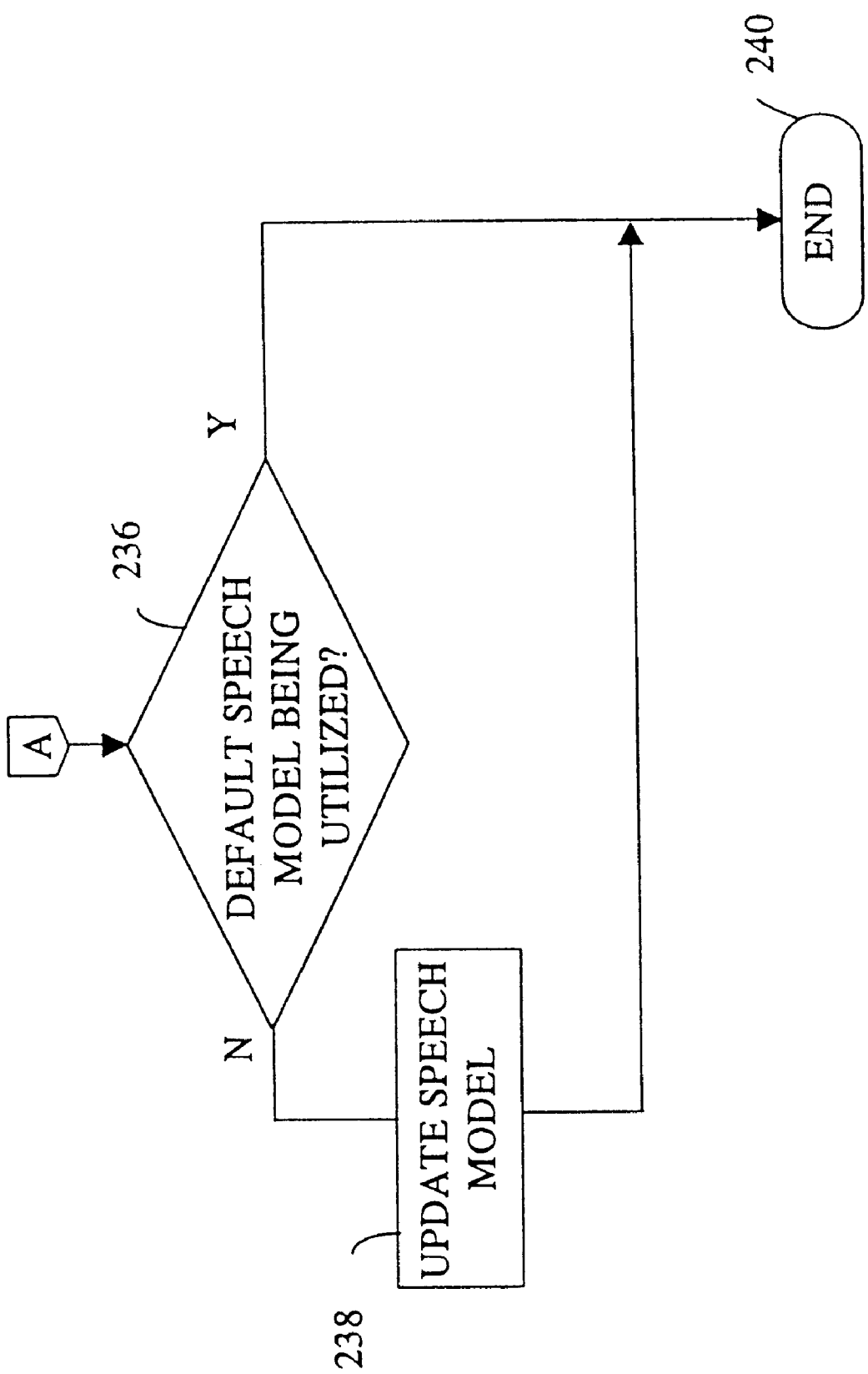

FIGS. 2A–2B are a flowchart of a face recognition routine 200 that is active when the automobile is running, according to an embodiment of the present invention. In step 202, routine 200 is initiated. Next, in step 204, a digital image of the driver's face is captured. As previously discussed, this occurs under the control of processor 102. When implemented as a digital camera, device 122 (under control processor 102) captures and transfers a digital image of the face of the driver of the vehicle to processor 102. Next, in step 206, processor 102 (executing commercially available face recognition software) compares the captured image to stored images of known drivers. Then, in step 208, processor 102 determines whether the captured image corresponds to a stored image. If so, control transfers from step 208 to step 216. Otherwise, control transfers from step 208 to step 210.

In step 210, processor 102 determines whether the new image is to be stored. If so, control transfers to step 212 where processor 102 causes a new speech model to be associated with the new image. From step 212, control transfers to step 218. In step 210, if processor 102 determines that the new image will not be stored, control transfers from step 210 to step 214. In step 214, processor 102 causes a default speech model to be loaded. From step 214, control transfers to step 218.

In step 208, if processor 102 determines that the captured image corresponds to a stored image, control transfers to step 216. Next, in step 216, processor 102 retrieves a stored speech model that corresponds to the captured image. Then, in step 218, processor 102 activates the speech recognition feature. Next, in step 220, if speech is detected, control transfers to step 230. Otherwise, control loops on step 220 until speech is detected (while routine 200 is active). In step 230, processor 102 determines whether the speech is recognized. If so, control transfers from step 230 to step 234. Otherwise, control transfers from step 230 to step 232 where processor 102 causes a prompt (e.g., voice or visual), such as "the detected speech is unrecognized, please repeat the command", to be provided to the user. From step 232, control transfers to step 220. In step 234, processor 102 causes the command that is associated with the recognized speech to be performed (e.g., changing the channel of an automotive radio receiver in response to the command "FM, 101.1). From step 234, control transfers to step 236.

In step 236, processor 102 determines whether the default speech model is being utilized. If so, control transfers from step 236 to step 240. Otherwise, control transfers to step 238 where processor 102 causes a user specific speech model to be updated. From step 238, control transfers to step 240 where routine 200 terminates. Thus, a face recognition routine 200 has been described that allows a speech recognition driven system to determine which specific user is utilizing the vehicle at a given time. Based upon the user, a new speech model is created, a stored speech model is updated or the default speech model is used.

In a preferred embodiment, device 122 is a camera that is focused on the driver's face (preferably mounted in a vehicle's windshield molding). A camera, so implemented, can also be used for drowsy-driver detection and point-of-gaze based control systems. Utilizing a camera in this manner is desirable in that the face recognition aspect of the speech recognition driven system can perform multiple functions. As discussed above, other biometric signatures (e.g., fingerprint, retina, iris) can be utilized to select a particular speech model. Face recognition based selection of speech models is generally preferred to the use of individualized key fobs (for each specific driver of a given automobile); as the key fobs can be accidentally switched amongst various drivers of the automobile, at which point the key fobs cannot be used to identify a specific driver.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for providing a speech model based on a biometric signature in a speech recognition driven system, comprising the steps of:
   receiving a biometric signature from a user of the system;
   selecting a speech model based on the received biometric signature;
   utilizing the selected speech model to determine whether a voice input provided by the user corresponds to a speech selectable task that is recognized by the speech recognition driven system; and
   performing a speech selectable task when the voice input provided by the user corresponds to a speech selectable task.

2. The method of claim 1, wherein the biometric signature is an image of the user's face.

3. The method of claim 1, wherein the system utilizes a default speech model when the system fails to recognize the biometric signature.

4. The method of claim 1, wherein the system creates a new speech model when the system fails to recognize the biometric signature.

5. The method of claim 1, further including the step of:
   updating the selected speech model such that the system adapts to the speech pattern of the user.

6. The method of claim 1, further including the step of:
   prompting the user to provide another voice input when the voice input is not recognized.

7. The method of claim 1, wherein the speech selectable task is performed by a motor vehicle accessory.

8. A speech recognition driven system that utilizes selectable speech models, comprising:
   a memory subsystem for storing information;
   a processor coupled to the memory subsystem;
   an audio input device coupled to the processor, the input device receiving a voice input from a user; and
   speech recognition code for causing the processor to perform the steps of:
      receiving a biometric signature from the user of the system;
      selecting a speech model based on the received biometric signature;
      utilizing the selected speech model to determine whether the voice input provided by the user corresponds to a speech selectable task that is recognized by the speech recognition driven system; and
      performing a speech selectable task when the voice input provided by the user corresponds to a speech selectable task.

9. The system of claim 8, wherein the biometric signature is an image of the user's face.

10. The system of claim 8, wherein the system utilizes a default speech model when the system fails to recognize the biometric signature.

11. The system of claim 8, wherein the system creates a new speech model when the system fails to recognize the biometric signature.

12. The system of claim 8, wherein the speech recognition code causes the processor to perform the additional steps of:
   updating the selected speech model such that the system adapts to the speech pattern of the user.

13. The system of claim 8, wherein the speech recognition code causes the processor to perform the additional steps of:
   prompting the user to provide another voice input when the voice input is not recognized.

14. The system of claim 8, further including:
   an audio output device coupled to the processor, the output device providing voice feedback to the user.

15. The system of claim 14, wherein the audio output device is a speaker.

16. The system of claim 8, wherein the audio input device is a microphone.

17. The system of claim 8, wherein the speech selectable task is performed by a motor vehicle accessory.

18. A multi-level speech recognition driven system for controlling motor vehicle accessories that utilizes selectable speech models, comprising:
   a memory subsystem for storing information;
   a processor coupled to the memory subsystem;
   a motor vehicle accessory coupled to the processor;
   an audio input device coupled to the processor, the input device receiving a voice input from a user; and
   speech recognition code for causing the processor to perform the steps of:
      receiving a biometric signature from the user of the system;
      selecting a speech model based on the received biometric signature;
      utilizing the selected speech model to determine whether the voice input provided by the user corresponds to a speech selectable task that is recognized by the speech recognition driven system; and
      controlling the motor vehicle accessory according to a speech selectable task when the voice input provided by the user corresponds to a speech selectable task.

19. The system of claim 18, wherein the biometric signature is an image of the user's face.

20. The system of claim 18, wherein the system utilizes a default speech model when the system fails to recognize the biometric signature.

21. The system of claim 18, wherein the system creates a new speech model when the system fails to recognize the biometric signature.

22. The system of claim 18, wherein the speech recognition code causes the processor to perform the additional steps of:
   updating the selected speech model such that the system adapts to the speech pattern of the user.

23. The system of claim 18, wherein the speech recognition code causes the processor to perform the additional steps of:
   prompting the user to provide another voice input when the voice input is not recognized.

24. The system of claim 18, further including:
   an audio output device coupled to the processor, the output device providing voice feedback to the user.

25. The system of claim 24, wherein the audio output device is a speaker.

26. The system of claim 18, wherein the audio input device is a microphone.

* * * * *